US012801301B2

(12) United States Patent
Raut et al.

(10) Patent No.: US 12,801,301 B2
(45) Date of Patent: Nov. 17, 2026

(54) IDENTIFY PROVIDER AGNOSTIC DEPARTMENTAL MULTI-TENANCY MANAGEMENT OF STORAGE RESOURCES

(71) Applicant: International Business Machines Corporation, Armonk, NY (US)

(72) Inventors: Smita J. Raut, Pune (IN); Chaitanya Ravindra Sathe, Pune (IN); Jai Manoj Vaswani, Pune (IN); Sandeep Ramesh Patil, Pune (IN); Stephen Blinick, Chandler, AZ (US); Thomas Keith Clark, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 18/947,034

(22) Filed: Nov. 14, 2024

(65) Prior Publication Data

US 2026/0133714 A1 May 14, 2026

(51) Int. Cl.
*G06F 3/06* (2006.01)

(52) U.S. Cl.
CPC .......... *G06F 3/0644* (2013.01); *G06F 3/0604* (2013.01); *G06F 3/0673* (2013.01)

(58) Field of Classification Search
CPC ..... G06F 3/0644; G06F 3/0604; G06F 3/0673
See application file for complete search history.

(56) References Cited

U.S. PATENT DOCUMENTS 8,352,941 B1 * 1/2013 Protopopov .......... H04L 63/102
718/1
8,683,103 B2 3/2014 Ripberger
8,996,837 B1 * 3/2015 Bono .................... G06F 3/0665
711/170
9,471,577 B2 10/2016 Ripberger
9,473,419 B2 10/2016 Brand
11,768,811 B1 9/2023 Ago et al.
11,954,238 B1 * 4/2024 Tan ....................... H04L 9/0891
(Continued)

FOREIGN PATENT DOCUMENTS

JP 7304449 B2 7/2023

OTHER PUBLICATIONS

K. Rawee, "How to Deploy High-Performance Multi-Tenant Object Storage with NVMe", POGO, Jun. 6, 2022, 8 pages.
(Continued)

*Primary Examiner* — Francisco A Grullon

(74) *Attorney, Agent, or Firm* — Cantor Colburn LLP; Heather Schuler

(57) ABSTRACT

Examples described herein provide a computer-implemented method for identity provider agnostic departmental multi-tenancy management of storage resources that includes providing a software-defined storage-as-a-service (SDSaaS) workspace that defines a tenancy circle, wherein the SDSaaS workspace interconnects an open-source container orchestration system namespace and the storage resources. The method further includes assigning the storage resources to departments within the SDSaaS workspace. The method further includes enabling departments to manage their own storage resources independently from one another. The method further includes implementing role-based access control at a SDSaaS workspace level to control user access to the storage resources of the SDSaaS workspace.

20 Claims, 6 Drawing Sheets

(56) References Cited

U.S. PATENT DOCUMENTS

| | | | |
|---|---|---|---|
| 2020/0050608 | A1 | 2/2020 | Zhao et al. |
| 2022/0201073 | A1 | 6/2022 | Mallikarjuna Durga Lokanath et al. |
| 2023/0403272 | A1 | 12/2023 | Cheethirala et al. |
| 2024/0069722 | A1 | 2/2024 | Bahirat |
| 2024/0220398 | A1 | 7/2024 | Pabón et al. |

OTHER PUBLICATIONS

Min, et al., "Gimbal: Enabling Multi-tenant Storage Disaggregation on SmartNIC JBOFs", SIGCOMM, Aug. 23-28, 2021, 17 pages.

Singh, A., "NVMe-OF Storage Delivers The Last Mile Of The Kubernetes Infrastructure Revolution", IT Hardware & Semiconductors, Mar. 2, 2020, 6 pages.

* cited by examiner

IDENTIFY PROVIDER AGNOSTIC DEPARTMENTAL MULTI-TENANCY MANAGEMENT OF STORAGE RESOURCES

BACKGROUND

The present disclosure relates to computing environments, and more specifically, to identity provider agnostic departmental multi-tenancy management of storage resources.

Software-defined storage (SDS) is a data storage architecture that decouples storage hardware from the software that manages it. This approach enables storage resources to be managed through software, offering more flexibility, scalability, and efficiency compared to traditional storage systems. By using commodity hardware and abstracting control into a software layer, SDS can pool and allocate storage across various devices and locations, allowing for dynamic provisioning, automation, and better integration with cloud or virtualized environments. This flexibility makes SDS ideal for modern data centers and enterprises seeking agility and efficient management of large, distributed datasets.

In a hybrid cloud environment, SDS enables seamless integration and management of storage across both on-premises infrastructure and public cloud resources. By abstracting the underlying storage, SDS allows organizations to dynamically allocate and move data between local data centers and cloud services based on desired characteristics such as performance, efficiency, or compliance. This flexibility enhances scalability, ensures better data mobility, and supports disaster recovery while maintaining centralized control over storage resources in a mixed cloud environment.

SUMMARY

According to an embodiment, a computer-implemented method for identity provider agnostic departmental multi-tenancy management of storage resources is provided. The method includes providing a software-defined storage-as-a-service (SDSaaS) workspace that defines a tenancy circle, wherein the SDSaaS workspace interconnects an open-source container orchestration system namespace and the storage resources. The method further includes assigning the storage resources to departments within the SDSaaS workspace. The method further includes enabling departments to manage their own storage resources independently from one another. The method further includes implementing role-based access control at a SDSaaS workspace level to control user access to the storage resources of the SDSaaS workspace. Such an embodiment provides efficient resource allocation. For example, by defining a tenancy circle through a software-defined storage-as-a-service workspace, one or more embodiments supports organized and efficient allocation of storage resources to different departments. This ensures that resources are used optimally and reduces waste.

Other embodiments described herein implement features of the above-described computer-implemented method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

DETAILED DESCRIPTION

Figure 1:
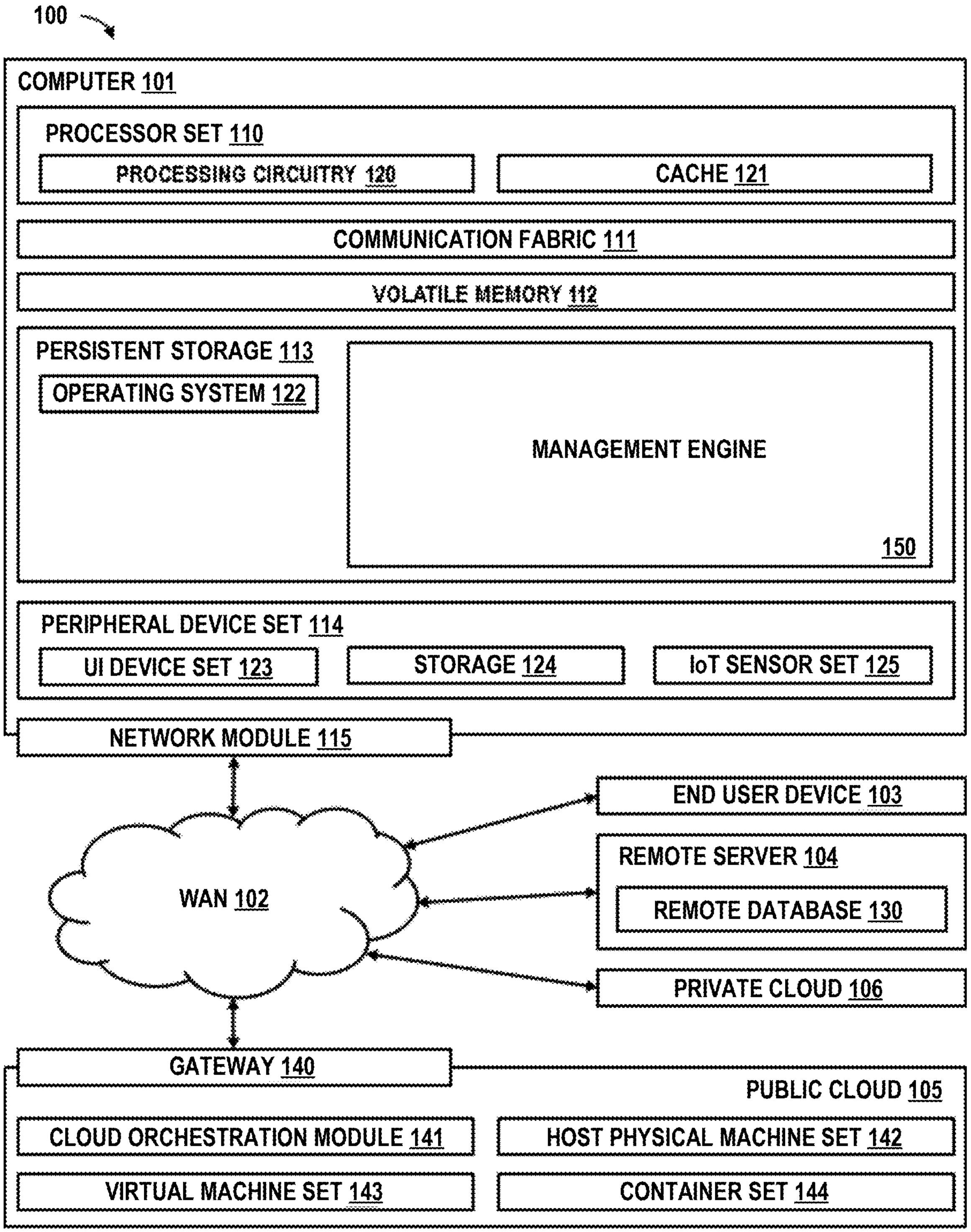
FIG. 1 illustrates a block diagram of a computing environment according to an embodiment of the present disclosure.

One or more embodiments described herein provides for identity provider agnostic departmental multi-tenancy management of storage resource.

According to an embodiment, a computer-implemented method for identity provider agnostic departmental multi-tenancy management of storage resources is provided. The method includes providing a software-defined storage-as-a-service (SDSaaS) workspace that defines a tenancy circle, wherein the SDSaaS workspace interconnects an open-source container orchestration system namespace and the storage resources. The method further includes assigning the storage resources to departments within the SDSaaS workspace. The method further includes enabling departments to manage their own storage resources independently from one another. The method further includes implementing role-based access control at a SDSaaS workspace level to control user access to the storage resources of the SDSaaS workspace. Such an embodiment provides efficient resource allocation. For example, by defining a tenancy circle through a software-defined storage-as-a-service workspace, one or more embodiments supports organized and efficient allocation of storage resources to different departments. This ensures that resources are used optimally and reduces waste.

According to an embodiment, a computer system is provided that includes a processor set, one or more computer-readable storage media, and program instructions stored on the one or more computer-readable storage media to cause the processor set to perform operations for identity provider agnostic departmental multi-tenancy management of storage resources. The operations include providing a software-defined storage-as-a-service (SDSaaS) workspace that defines a tenancy circle; the SDSaaS workspace interconnects an open-source container orchestration system namespace and the storage resources. The operations further include assigning the storage resources to departments within the SDSaaS workspace. The operations further include enabling departments to manage their own storage resources independently from one another. The operations further include implementing role-based access control at a SDSaaS workspace level to control user access to the storage resources of the SDSaaS workspace. Such an embodiment provides efficient resource allocation. For example, by defining a tenancy circle through a software-defined storage-as-a-service workspace, one or more embodiments supports organized and efficient allocation of storage resources to different departments. This ensures that resources are used optimally and reduces waste.

In yet another embodiment, a computer program product is provided that includes one or more computer-readable storage media and program instructions stored on the one or more computer-readable storage media to perform operations for identity provider agnostic departmental multi-tenancy management of storage resources. The operations include providing a software-defined storage-as-a-service (SDSaaS) workspace that defines a tenancy circle; the SDSaaS workspace interconnects an open-source container orchestration system namespace and the storage resources. The operations further include assigning the storage resources to departments within the SDSaaS workspace. The operations further include enabling departments to manage their own storage resources independently from one another. The operations further include implementing role-based access control at a SDSaaS workspace level to control user access to the storage resources of the SDSaaS workspace. Such an embodiment provides efficient resource allocation. For example, by defining a tenancy circle through a software-defined storage-as-a-service workspace, one or more embodiments supports organized and efficient allocation of storage resources to different departments.

In embodiments, the storage resources include non-volatile memory express over transport control protocol (NVMe/TCP) subsystems. Utilizing NVMe/TCP subsystems for storage resources provides high-speed data transfer and low latency which enhances the performance and responsiveness of the storage system. This results in faster data access and improved overall system performance.

In embodiments, the SDSaaS workspace is agnostic to identity providers by allowing integration with multiple identity management systems and cloud identity management services. Being agnostic to identity providers allows the SDSaaS workspace to integrate seamlessly with various identity management systems and cloud services. This flexibility ensures that the system can adapt to different organizational environments and requirements, enhancing its scalability and interoperability.

In embodiments, the computer-implemented method further includes facilitating loose coupling between various layers of a software stack of the SDSaaS workspace to support flexibility and scalability across diverse customer environments. Facilitating loose coupling between software stack layers enhances the flexibility and scalability of the SDSaaS workspace. This design allows for easier updates, maintenance, and integration with other systems, resulting in a more adaptable and resilient storage management solution.

In embodiments, implementing the role-based access control at a SDSaaS workspace level to control user access to the storage resources of the SDSaaS workspace includes implementing the role-based access control with granular access levels for different user roles within the SDSaaS workspace. Implementing granular role-based access control ensures that access to storage resources is precisely managed according to user roles. This enhances security by preventing unauthorized access and allows for fine-tuned control over resource permissions, aligning with organizational policies and compliance requirements.

In embodiments, storage resources assigned to a first department are inaccessible to users associated with a second department and storage resources of the second department are inaccessible to users associated with the first department. Ensuring that storage resources are inaccessible between departments provides strong data isolation and security. This prevents data leakage and unauthorized access, maintaining the integrity and confidentiality of departmental data.

In embodiments, the SDSaaS workspace has an associated workspace identifier (ID). Associating a workspace ID with the SDSaaS workspace allows for precise identification and management of storage resources. This facilitates efficient tracking, auditing, and administration of storage resources within the system.

In embodiments, the SDSaaS workspace is one of a plurality of SDSaaS workspaces; a separate open-source container orchestration system namespace is created for each of the plurality of SDSaaS workspaces, and storage resource objects are created within each separate open-source container orchestration system namespace. Creating separate open-source container orchestration system namespaces for each SDSaaS workspace ensures isolation and independent management of storage resources. This design enhances security, prevents resource conflicts, and allows for tailored management practices for each workspace.

In modern computing environments, managing storage resources efficiently and securely remains a significant challenge. Organizations often require robust solutions to handle storage across various departments to ensure that resources are allocated and managed effectively. It should be appreciated that the discussion of "departments" throughout is representative of any tenancy entity. For example, a department can be a subsidiary of a business, a business partner, a business unit, and/or the like, including combinations and/or multiples thereof. That is, a department is any suitable tenancy where there is some level of trust between the tenants or between the parent tenant and its sub-tenant.

The complexity increases in hybrid cloud environments where storage integrates seamlessly across on-premises and cloud infrastructures. This integration demands a flexible and scalable approach to manage storage resources dynamically, catering to performance, efficiency, and compliance needs.

Existing approaches for storage management often fall short in providing comprehensive departmental multi-tenancy. Many storage systems lack the capability to offer isolation and independent management of storage resources at a departmental level, especially hybrid cloud-based systems. This limitation hinders organizations from effectively controlling access and usage of storage resources, leading to potential security risks and inefficiencies. Additionally, current systems may not support integration with multiple identity providers, restricting their adaptability to support different customer environments and identity management systems.

One or more embodiments described herein addresses these challenges by providing identity provider agnostic departmental multi-tenancy management of storage resource. Such embodiments enable departments to have their own storage resources, manage them independently, and implement role-based access control at the workspace level. By interconnecting open-source container orchestration system namespaces with non-volatile memory express over transport control protocol (NVMe/TCP) subsystems, one or more embodiments creates a flexible and scalable solution that works seamlessly with any identity provider.

Such approaches ensure that storage resources are managed efficiently, securely, and in a manner that supports diverse customer environments.

Descriptions of various embodiments of the present disclosure are presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, and/or to enable others of ordinary skill in the art to understand the embodiments disclosed herein.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100 according to an embodiment of the present disclosure. Computing environment 100 contains an example of an environment for the execution of at least some of the computer code involved in performing the inventive methods, such as a management engine 150 for identity provider agnostic departmental multi-tenancy management of storage resources. In addition to the management engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the management engine 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the management engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in the management engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The management engine 150 provides for identity provider agnostic departmental multi-tenancy management of storage resource.

Further features of the management engine 150 are now described in more detail with references to FIGS. 2-5 but are not so limited.

Figure 2:
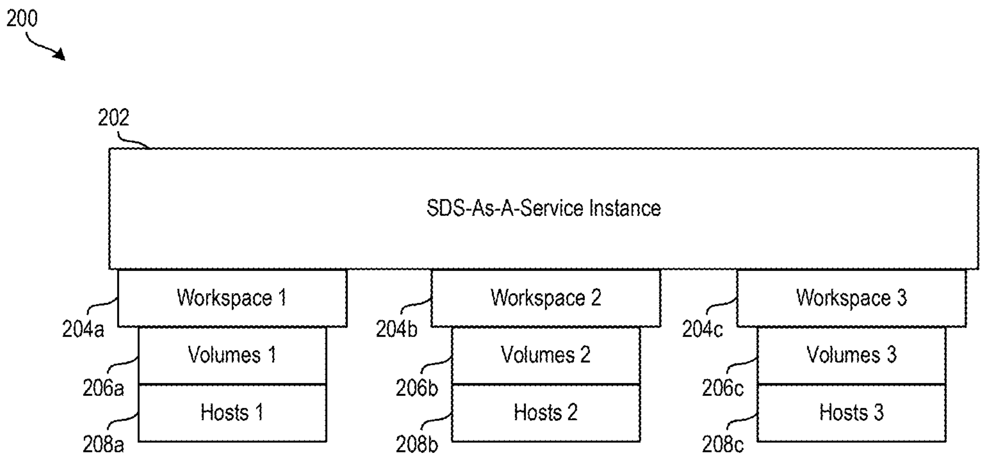
FIG. 2 illustrates a block diagram of a software-defined storage stack according to an embodiment of the present disclosure.

FIG. 2 illustrates a block diagram of a software-defined storage stack 200 according to an embodiment of the present disclosure. The software-defined storage stack 200 includes an SDS-as-a-Service (SDSaaS) instance 202. The SDSaaS instance 202 supports multiple workspaces such as workspace 1 204*a*, workspace 2 204*b*, and workspace 3 204*c* (collectively "workspaces 204"). Each of the workspaces 204 supports volumes and hosts. For example, workspace 1 204*a* supports volumes 1 206*a* and hosts 1 208*a*, workspace 2 204*b* supports volumes 2 206*b* and hosts 2 208*b*, and workspace 3 204*c* supports volumes 3 206*c* and hosts 3 208*c*.

The SDSaaS instance 202 serves as the central management entity for the software-defined storage stack 200. The SDSaaS instance 202 facilitates the allocation and management of storage resources across multiple workspaces, ensuring seamless integration and operation within the system.

Workspace 1 204*a* operates under the SDSaaS instance 202, managing volumes 1 206*a* and hosts 1 208*a*. Workspace 1 204*a* provides a dedicated environment for specific departmental storage needs, allowing for independent management and configuration. Volumes 1 206*a* are associated with workspace 1 204*a* and represent the storage units allocated to this workspace. These volumes are managed independently, providing flexibility in storage allocation and usage. Hosts 1 208*a* are linked to workspace 1 204*a* and facilitate the deployment and operation of applications within the workspace 1 204*a*. Hosts 1 208*a* ensure that the necessary computational resources are available for efficient operation, for example.

Workspace 2 204*b*, similar to workspace 1 204*a*, operates under the SDSaaS instance 202 managing volumes 2 206*b* and hosts 2 208*b*. Workspace 2 204*b* provides a dedicated environment for specific departmental storage needs, allowing for independent management and configuration. Volumes 2 206*b* are associated with workspace 2 204*b* and represent the storage units allocated to this workspace. These volumes are managed independently, providing flexibility in storage allocation and usage. Hosts 2 208*b* are linked to workspace 2 204*b* and facilitate the deployment and operation of applications within the workspace 2 204*b*. Hosts 2 208*b* ensure that the necessary computational resources are available for efficient operation, for example.

Workspace 3 204*c*, similar to workspace 1 204*a* and workspace 2 204*b*, operates under the SDSaaS instance 202 managing volumes 3 206*c* and hosts 3 208*c*. Workspace 3 204*c* provides a dedicated environment for specific departmental storage needs, allowing for independent management and configuration. Volumes 3 206*c* are associated with workspace 3 204*c* and represent the storage units allocated to this workspace. These volumes are managed independently, providing flexibility in storage allocation and usage. Hosts 3 208*c* are linked to workspace 3 204*c* and facilitate the deployment and operation of applications within the workspace 3 204*c*. Hosts 3 208*c* ensure that the necessary computational resources are available for efficient operation, for example.

Workspaces, such as the workspaces 204, can be used to group together resources belonging to one department. At the SDSaaS layer (e.g., SDSaaS instance 202), this is a logical concept, but it will be a resource that is registered with an identity access and management (IAM) service to grant access to one of the workspaces 204 based on roles defined by the IAM service. This way, an administrator need not grant the same role-based access at the individual storage resource level for every user in a department. The validation for this role-based access is performed at a management level of the workspaces 204 (e.g., via an application programming interface (API)).

Workspaces, such as the workspaces 204, are logical entities registered with the IAM service and are treated as an independent resource that has an identifier (ID or workspace ID). Departmental isolation is achieved as follows. The workspace ID is associated with the storage resource representation objects being created (e.g., volume/host). A separate open-source container orchestration system namespace is created for each workspace and the storage resource objects are created within that namespace. In open-source container orchestration systems, namespaces provide a mechanism for isolating groups of resources within a single cluster. In the SASaaS for NVMe volume access control, an NVMe subsystem is created corresponding to the workspace and volumes (e.g., Reliable Autonomic Distributed Object Store (RADOS) Block Device (RBD)) for a department are mapped to the subsystem as NVMe namespaces. Further, host NVMe qualified names (NQNs) for hosts within the workspace are added to the subsystem NQN allow list, thereby allowing the hosts and volumes within the same workspace to be mapped to one another.

The workspaces, such as the workspaces 204, can be used as a logical construct to implement isolation using the native technology of a system stack, such as open-source container orchestration systems and software-defined storage platform NVMe, which enables loose coupling with IAM control. For authorization validation, a generic interface can be defined with different implementations for various identity provides, for example.

More particularly, the workspaces 204 provide for IAM control. IAM provides for defining how users access digital resources and what they can do with those resources. IAM helps streamline access control, protecting assets without disrupting legitimate uses of those assets. IAM can be used to assign every user in an organization or department a distinct digital identity with permissions that are tailored to the user's role, compliance needs, and other factors. This way, IAM ensures that only the right users can access the right resources for the right reasons while unauthorized access and activities are blocked.

Figure 3:
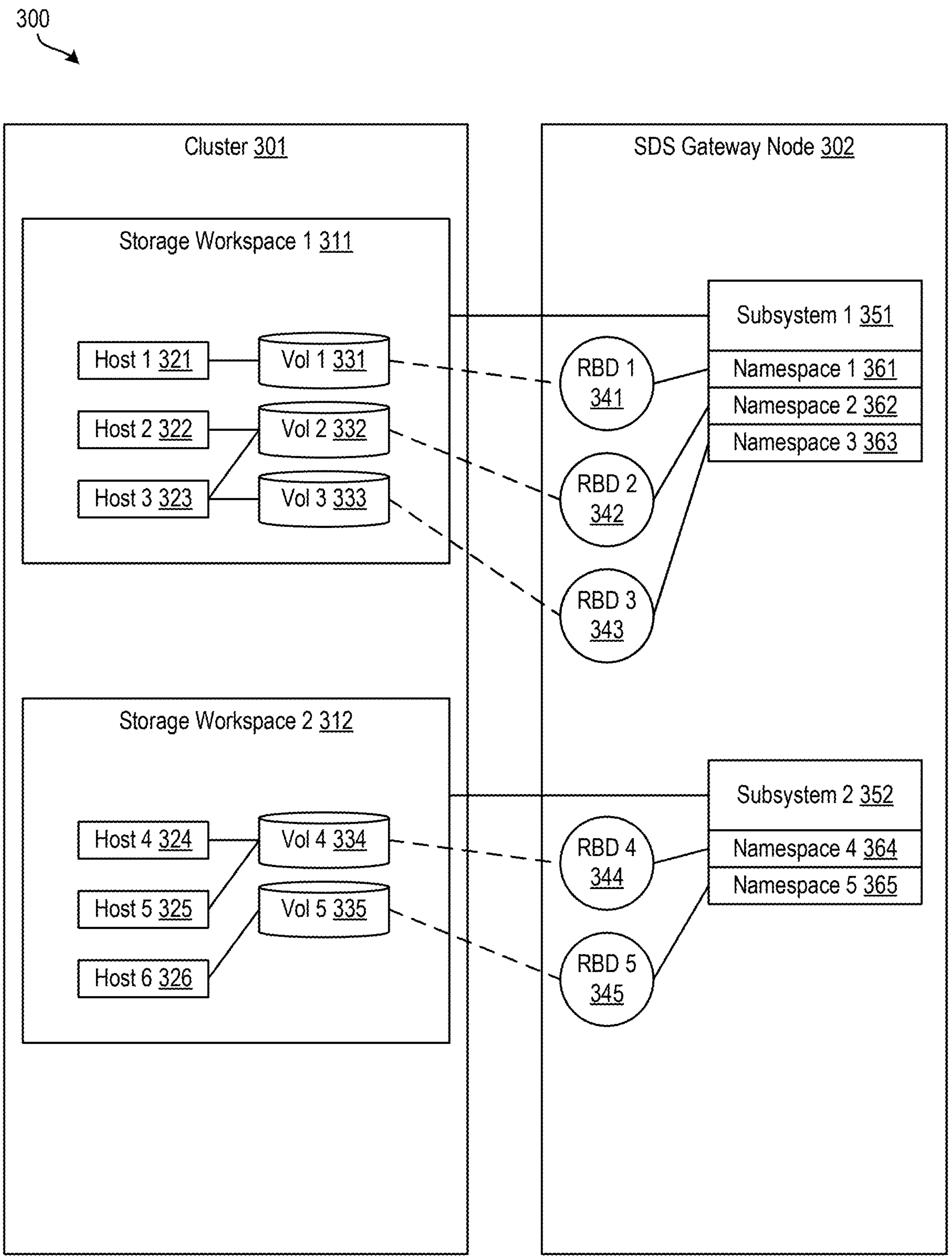
FIG. 3 illustrates a flow diagram of a system for identity provider agnostic departmental multi-tenancy management of storage resources according to an embodiment of the present disclosure.

FIG. 3 illustrates a flow diagram of a system 300 for identity provider agnostic departmental multi-tenancy management of storage resources according to an embodiment of the present disclosure.

The system 300 includes Cluster 301, SDS Gateway Node 302, Storage Workspace SW1 311, Storage Workspace SW2 312, Subsystem 1 351, Subsystem 2 352, and various hosts and volumes. The system 300 facilitates the management and allocation of storage resources across different workspaces and subsystems to provide identity provider agnostic departmental multi-tenancy management of storage resources.

Cluster 301 serves as a central node for managing storage resources within the system 300. Cluster 301 supports storage workspaces, such as Storage Workspace 1 311 and Storage Workspace 2 312, enabling the allocation and management of storage resources across these workspaces. Cluster 301 ensures seamless integration and operation within the system 300 using the workspaces.

Storage Workspace 1 311 operates under Cluster 301 managing Host 1 321, Host 2 322, Host 3 323, Volume 1 331, Volume 2 332, and Volume 3 333. It should be appreciated that more or fewer hosts and/or volumes can be implemented in other embodiments. Storage Workspace 1 311 provides a dedicated environment for specific departmental storage needs, allowing for independent management and configuration of hosts and volumes.

Host 1 321, Host 2 322, and Host 3 323 are linked to Storage Workspace 1 311, facilitating the deployment and operation of applications within this workspace. These hosts ensure that the computational resources are available for efficient operation. Volume 1 331, Volume 2 332, and Volume 3 333 are associated with Storage Workspace 1 311 and represent the storage units allocated to this workspace. These volumes are managed independently, providing flexibility in storage allocation and usage.

Storage Workspace 2 312, similar to Storage Workspace 1 311, manages Host 4 324, Host 5 325, Host 6 326, Volume 4 334, and Volume 5 335. Storage Workspace 2 312 provides another isolated environment for departmental storage management, ensuring secure and efficient resource allocation. For example, whereas Storage Workspace 1 311 may manage a first department (e.g., a legal department), Storage Workspace 2 312 may manage a second department that is separate and distinct from the first department (e.g., a marketing department).

Host 4 324, Host 5 325, and Host 6 326 are associated with Storage Workspace 2 312, providing the infrastructure for application deployment and management. These hosts ensure that Storage Workspace 2 312 operates effectively within the system 300.

Volume 4 334 and Volume 5 335 are part of Storage Workspace 2 312 and are managed to meet the specific storage requirements of this workspace. These volumes allow for tailored storage solutions within the system 300.

SDS Gateway Node 302 communicatively connects to Storage Workspace 1 311 and Storage Workspace 2 312 of Cluster 301. SDS Gateway Node 302 supports subsystems, such as Subsystem 1 351 and Subsystem 2 352, facilitating the management of storage resources across these subsystems. SDS Gateway Node 302 ensures efficient operation and integration within the system 300.

Subsystem 1 351 includes RBD 1 341, RBD 2 342, RBD 3 343, Namespace 1 361, Namespace 2 362, and Namespace 3 363. These components interact to manage storage resources and access policies within the subsystem, providing a framework for role-based access control.

Subsystem 2 352 includes RBD 4 344, RBD 5 345, Namespace 4 364, and Namespace 5 365. These components work together to manage storage resources and access policies, supporting the deployment and management of hosts in a multi-tenancy environment.

RBD stands for RADOS Block Device. An RBD is a reliable and flexible block storage solution within the SDSssA ecosystem. RBD 1 341, RBD 2 342, RBD 3 343, RBD 4 344, and RBD 5 345 provides block storage by leveraging the SDSaaS's distributed architecture, ensuring high availability and redundancy. RBD is highly scalable, allowing for increased storage capacity without downtime.

As shown in FIG. 3, Subsystem 1 351 interfaces with Storage Workspace 1 311 but not Storage Workspace 2 322; similarly, Subsystem 2 352 interfaces with Storage Workspace 2 312 but not Storage Workspace 1 321. This provides for the system 300 to support identity provider agnostic departmental multi-tenancy management of storage resources, including, for example, Volume 1 331, Volume 2 332, Volume 3 333, Volume 4 334 and Volume 5 335.

The system 300 provides a purpose-built storage management stack for cloud storage built using a container-based software. This approach provides a software defined storage solution built using software defined storage software. According to one or more embodiments, a block storage service is provided for SDSaaS using a software-defined storage platform's thinly provisioned RBDs (e.g., RBD 1 341, RBD 2 342, RBD 3 343, RBD 4 344, and RBD 5 345). According to one or more embodiments, NVMe host mapping capabilities are provided by the use of a software-defined storage platform NVMe/TCP gateway (e.g., the SDS gateway node 302) that is run on a storage platform and used to provide NVMe-over-Fabrics access to the RBDs.

Figure 4A:
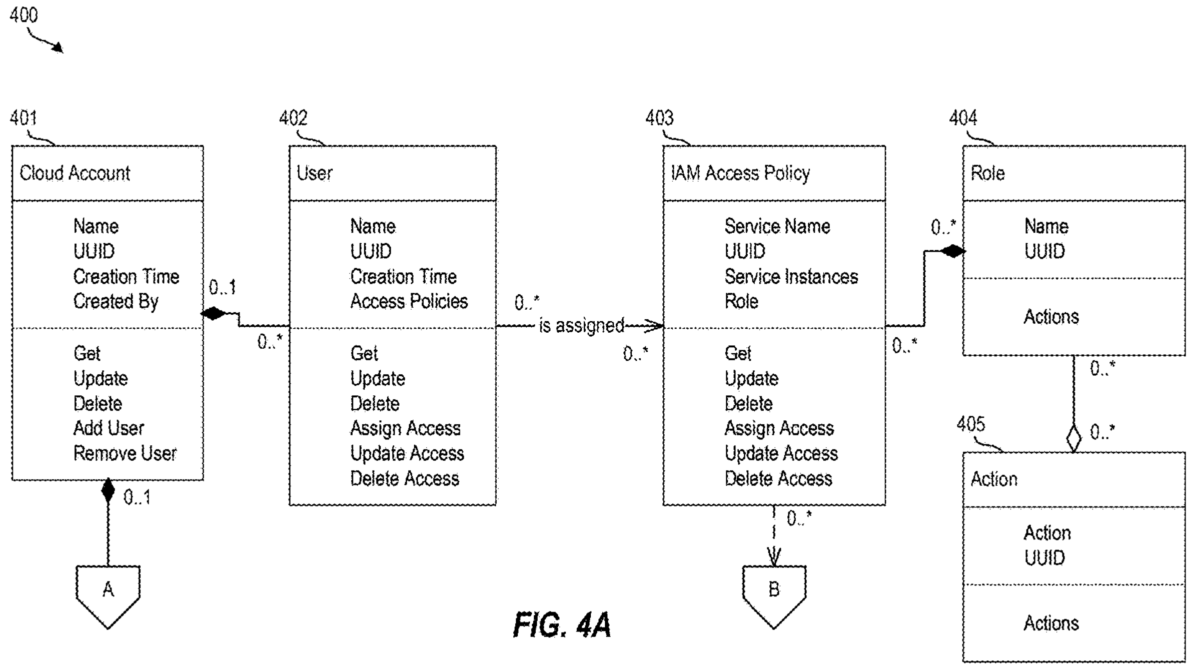
FIGS. 4A and 4B together illustrate a relationship diagram for identity provider agnostic departmental multi-tenancy management of storage resources according to an embodiment of the present disclosure.
Figure 4B:
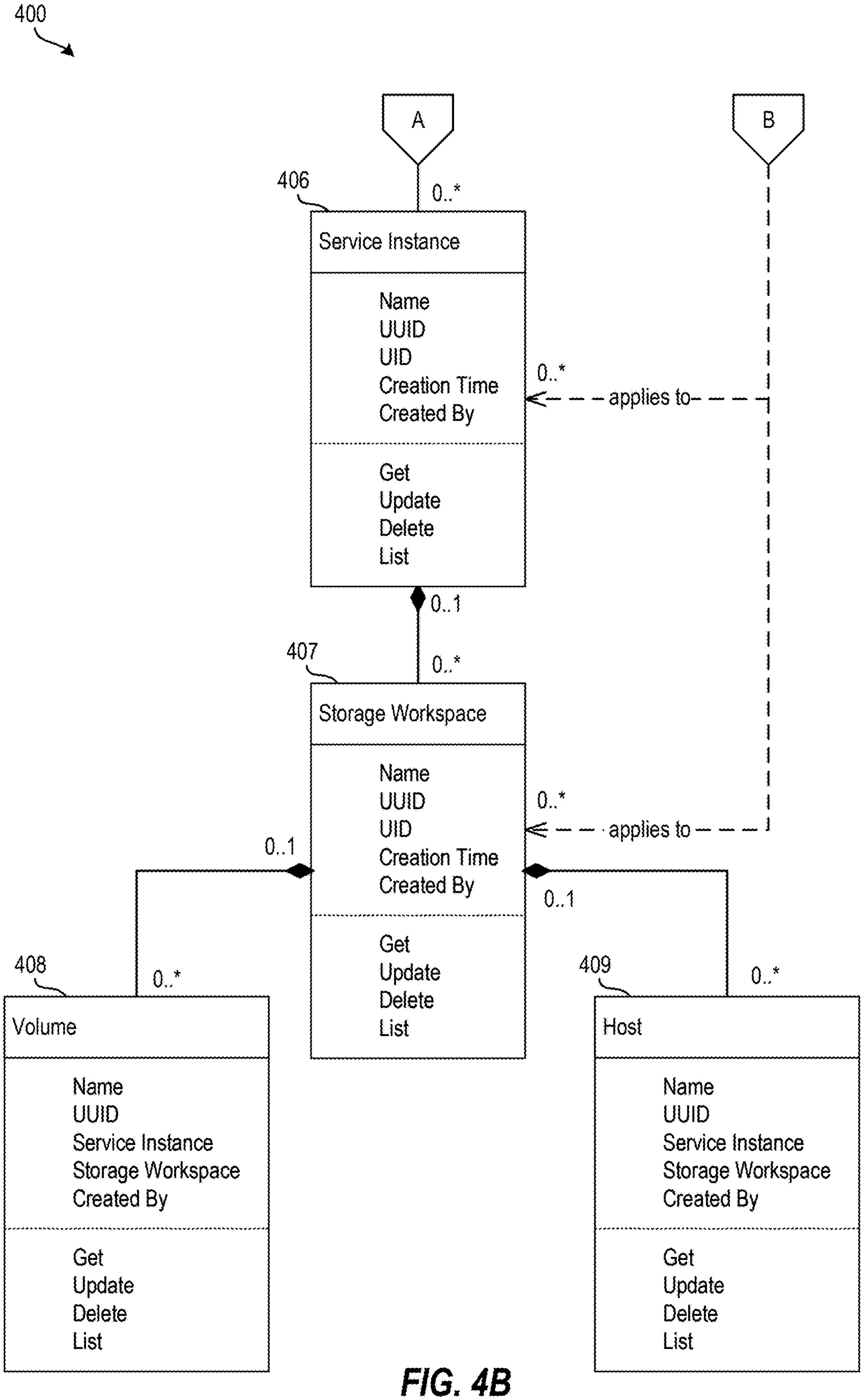

FIGS. 4A and 4B together illustrate a relationship diagram 400 for identity provider agnostic departmental multi-tenancy management of storage resources according to an embodiment of the present disclosure. The relationship diagram 400 includes various tables configured and arranged as shown; other configurations and arrangements are possible in other embodiments.

With reference to FIG. 4A, the relationship diagram 400 includes a cloud account table 401, a user table 402, an IAM access policy table 403, a role table 404, and an action table 405. These components interact to manage storage resources and access policies.

The cloud account table 401 includes attributes such as name, unique user identifier (UUID), creation time, and created by attributes. The cloud account table 401 provides functionalities to get, update, delete, add users, and remove users. The cloud account table 401 interacts with the user table 402 to manage user associations with cloud accounts.

The user table 402 includes attributes such as name, UUID, creation time, and access policies. The user table 402 allows operations such as getting, updating, deleting, assigning access, updating access, and deleting access. The user table 402 is linked to the IAM access policy table 403, facilitating the assignment of access policies to users.

The IAM access policy table 403 includes attributes such as service name, UUID, service instances, and role. The IAM access policy table 403 supports actions like getting, updating, assigning access, updating access, and deleting access. The IAM access policy table 403 connects with the role table 404 to define roles associated with access policies.

The role table 404 includes attributes, such as name and UUID, along with associated actions. The role table 404 interacts with the action table 405 to specify actions linked to roles. This table enables the definition and management of roles within the system.

The action table 405 includes action, UUID, and actions. The action table 405 details the specific actions that can be performed within the system, providing a framework for role-based access control.

Turning now to FIG. 4B, relationship diagram 400 of FIG. 4A is further described. As shown in FIG. 4B, the relationship diagram 400 includes service instance table 406, storage workspace table 407, volume table 408, and host table 409. These tables interact to manage storage resources and access policies within a multi-tenancy framework.

Service instance table 406 includes attributes such as name, UUID, user identifier (UID), creation time, and created by. Service instance table 406 provides functionalities to get, update, delete, and list service instances. Service instance table 406 applies to multiple storage workspaces, facilitating the management of service instances across different environments.

Storage workspace table 407 includes attributes such as name, UUID, UID, creation time, and created by. Storage workspace table 407 allows operations such as getting, updating, deleting, and listing storage workspaces. Storage workspace table 407 interacts with service instance table 406 to manage the association of service instances with storage workspaces.

Volume table 408 includes attributes such as name, UUID, service instance, storage workspace, and created by. Volume table 408 supports actions, such as getting, updating, deleting, and listing volumes. Volume table 408 is linked to storage workspace table 407, enabling the management of volumes within specific storage workspaces.

Host table 409 includes attributes such as name, UUID, service instance, storage workspace, and created by. Host table 409 provides functionalities to get, update, delete, and list hosts. Host Table 409 interacts with storage workspace table 407 to manage host associations within storage workspaces, supporting the deployment and management of hosts in a multi-tenancy environment.

Figure 5:
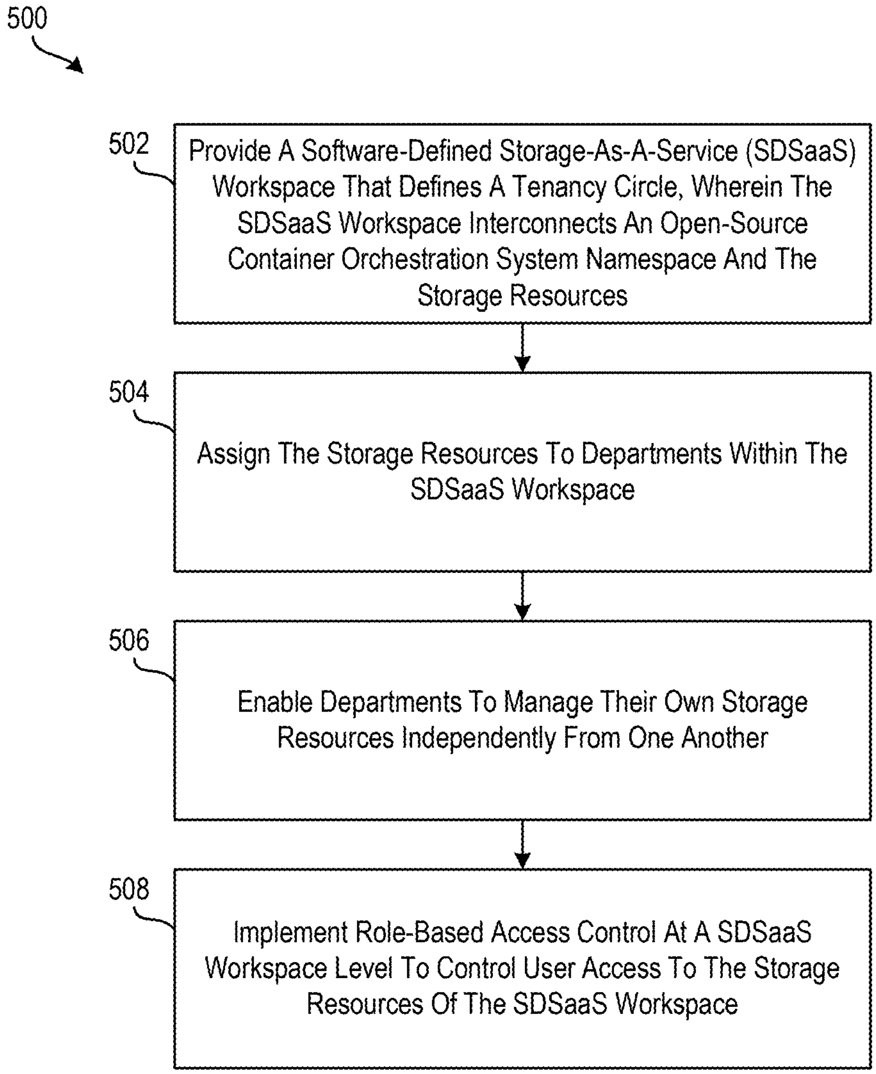
FIG. 5 illustrates a flow diagram of a method for identity provider agnostic departmental multi-tenancy management of storage resource according to an embodiment of the present disclosure.

Turning now to FIG. 5, a flow diagram of a method 500 for identity provider agnostic departmental multi-tenancy management of storage resource is provided according to an embodiment of the present disclosure. The method 500 can be performed by any suitable computing system, device, or environment such as those described herein. The method 500 is now described with reference to the computing environment 100, and particularly the management engine 150, but is not so limited. For example, the method 500 may be performed by the management engine 150.

Block 502 initiates the method 500, where a software-defined storage-as-a-service (SDSaaS) workspace is provided. The SDSaaS defines a tenancy circle. A tenancy circle refers to a defined scope within a SDSaaS workspace that interconnects open-source container orchestration system namespaces and storage resources. It establishes a framework for managing storage resources, allowing departments to have their own isolated environments for storage management. This concept enables independent management, role-based access control, and integration with various identity providers, ensuring efficient and secure allocation of storage resources across different departments. According to one or more embodiments, the storage resources include NVMe/TCP subsystems; other types of storage resources can be used in other embodiments. According to one or more embodiments, the SDSaaS workspace is agnostic to identity providers by allowing integration with multiple identity management systems and cloud identity management services.

At block 504, the management engine 150 assigns the storage resources to departments within the SDSaaS workspace. This step ensures that each department receives specific storage resources, facilitating organized and efficient resource allocation.

At block 506, the management engine 150 enables departments to manage their own storage resources independently from one another. This independence allows departments to tailor their storage management practices according to their needs and requirements.

At block 508, the management engine 150 implements role-based access control at a SDSaaS workspace level to control user access to the storage resources of the SDSaaS workspace. This step ensures secure and controlled access to storage resources, aligning with organizational policies and user roles. According to one or more embodiments, implementing role-based access control at a SDSaaS workspace level to control user access to the storage resources of the SDSaaS workspace includes implementing role-based access control with granular access levels for different user roles within the SDSaaS workspace. For example, storage resources assigned to a first department are inaccessible to users associated with a second department, and storage resources of the second department are inaccessible to users associated with the first department.

Additional processes also may be included. For example, the method 500 may include facilitating loose coupling between various layers of a software stack of the SDSaaS workspace to support flexibility and scalability across diverse customer environments.

It should be understood that the processes depicted in FIG. 5 represent illustrations, and that other processes may be added or existing processes may be removed, modified, or rearranged without departing from the scope of the present disclosure. It should also be understood that the processes depicted in FIG. 5 may be implemented as programmatic instructions stored on a non-transitory computer-readable storage medium that, when executed by a processor (e.g., the processor set 110 and/or the processing circuitry 120) of a computing system (e.g., the computer 101), cause the processor to perform the processes described herein.

One or more embodiments described herein improves the functioning of a computer by providing for identity provider agnostic departmental multi-tenancy management of storage resources. Such embodiments enhance computer operations in several ways, which are now described in more detail.

One or more embodiments of the present disclosure provide efficient resource allocation. For example, by defining a tenancy circle through a software-defined storage-as-a-service workspace, one or more embodiments supports organized and efficient allocation of storage resources to different departments. This ensures that resources are used optimally and reduces waste.

One or more embodiments provide independent management. For example, departments of an organization can manage their own storage resources independently, allowing for tailored management practices that suit specific needs. This independence reduces bottlenecks and improves the responsiveness of storage management.

One or more embodiments provide role-based access control (RBAC). For example, implementing RBAC at the workspace level ensures secure and controlled access to storage resources. This enhances security by aligning access with organizational policies and user roles, preventing unauthorized access and potential data breaches.

One or more embodiments provide scalability and flexibility. For example, one or more embodiments supports integration with multiple identity management systems and cloud services, making such embodiments adaptable to diverse customer environments. This flexibility allows one or more embodiments to scale with organizational growth and changing requirements.

One or more embodiments provide seamless integration. For example, by interconnecting open-source container orchestration system namespaces with NVMe/TCP subsystems, one or more embodiments provides a cohesive and scalable solution that works seamlessly with any identity provider. This integration simplifies the management of complex storage environments.

Overall, one or more embodiments of the present disclosure enhances the efficiency, security, and adaptability of computer systems in managing storage resources across departments in a departmental multi-tenancy environment.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method for identity provider agnostic departmental multi-tenancy management of storage resources, the method comprising:

providing a software-defined storage-as-a-service (SDSaaS) workspace that defines a tenancy circle, wherein the SDSaaS workspace interconnects an open-source container orchestration system namespace and the storage resources, wherein the SDSaaS workspace is a logical entity registered with an identity access and management (IAM) service and treated as an independent resource to which access is granted based on roles defined by the IAM service;

assigning the storage resources to departments within the SDSaaS workspace;

enabling departments to manage their own storage resources independently from one another; and implementing role-based access control at a SDSaaS workspace level to control user access to the storage resources of the SDSaaS workspace.

2. The computer-implemented method of claim 1, wherein the storage resources comprise non-volatile memory express over transport control protocol (NVMe/TCP) subsystems.

3. The computer-implemented method of claim 1, wherein the SDSaaS workspace is agnostic to identity providers by allowing integration with multiple identity management systems and cloud identity management services.

4. The computer-implemented method of claim 1, further comprising facilitating loose coupling between various layers of a software stack of the SDSaaS workspace to support flexibility and scalability across diverse customer environments.

5. The computer-implemented method of claim 1, wherein implementing the role-based access control at a SDSaaS workspace level to control user access to the storage resources of the SDSaaS workspace comprises implementing the role-based access control with granular access levels for different user roles within the SDSaaS workspace.

6. The computer-implemented method of claim 1, wherein storage resources assigned to a first department are inaccessible to users associated with a second department, and wherein storage resources of the second department are inaccessible to users associated with the first department.

7. The computer-implemented method of claim 1, wherein the SDSaaS workspace has an associated workspace identifier (ID).

8. The computer-implemented method of claim 1, wherein the SDSaaS workspace is one of a plurality of SDSaaS workspaces, and wherein a separate open-source container orchestration system namespace is created for each of the plurality of SDSaaS workspaces and storage resource objects are created within each separate open-source container orchestration system namespace.

9. A computer system comprising:

a processor set;

one or more computer-readable storage media; and program instructions stored on the one or more computer-readable storage media to cause the processor set to perform operations for identity provider agnostic departmental multi-tenancy management of storage resources, the operations comprising:

providing a software-defined storage-as-a-service (SDSaaS) workspace that defines a tenancy circle, wherein the SDSaaS workspace interconnects an open-source container orchestration system namespace and the storage resources, wherein the SDSaaS workspace is a logical entity registered with an identity access and management (IAM) service and treated as an independent resource to which access is granted based on roles defined by the IAM service;

assigning the storage resources to departments within the SDSaaS workspace;

enabling departments to manage their own storage resources independently from one another; and implementing role-based access control at a SDSaaS workspace level to control user access to the storage resources of the SDSaaS workspace.

10. The computer system of claim 9, wherein the storage resources comprise non-volatile memory express over transport control protocol (NVMe/TCP) subsystems.

11. The computer system of claim 9, wherein the SDSaaS workspace is agnostic to identity providers by allowing integration with multiple identity management systems and cloud identity management services.

12. The computer system of claim 9, wherein the operations further comprise facilitating loose coupling between various layers of a software stack of the SDSaaS workspace to support flexibility and scalability across diverse customer environments.

13. The computer system of claim 9, wherein implementing the role-based access control at a SDSaaS workspace level to control user access to the storage resources of the SDSaaS workspace comprises implementing the role-based access control with granular access levels for different user roles within the SDSaaS workspace.

14. The computer system of claim 9, wherein storage resources assigned to a first department are inaccessible to users associated with a second department, and wherein storage resources of the second department are inaccessible to users associated with the first department.

15. The computer system of claim 9, wherein the SDSaaS workspace has an associated workspace identifier (ID).

16. The computer system of claim 9, wherein the SDSaaS workspace is one of a plurality of SDSaaS workspaces, and wherein a separate open-source container orchestration system namespace is created for each of the plurality of SDSaaS workspaces and storage resource objects are created within each separate open-source container orchestration system namespace.

17. A computer program product comprising:

one or more computer-readable storage media; and program instructions stored on the one or more computer-readable storage media to perform operations, by a processor, for identity provider agnostic departmental multi-tenancy management of storage resources, the operations comprising:

providing a software-defined storage-as-a-service (SDSaaS) workspace that defines a tenancy circle, wherein the SDSaaS workspace interconnects an open-source container orchestration system namespace and the storage resources, wherein the SDSaaS workspace is a logical entity registered with an identity access and management (IAM) service and treated as an independent resource to which access is granted based on roles defined by the IAM service;

assigning the storage resources to departments within the SDSaaS workspace;

enabling departments to manage their own storage resources independently from one another; and implementing role-based access control at a SDSaaS workspace level to control user access to the storage resources of the SDSaaS workspace.

18. The computer program product of claim 17, wherein the storage resources comprise non-volatile memory express over transport control protocol (NVMe/TCP) subsystems.

19. The computer program product of claim 17, wherein the SDSaaS workspace is agnostic to identity providers by allowing integration with multiple identity management systems and cloud identity management services.

20. The computer program product of claim 17, wherein the operations further comprise facilitating loose coupling between various layers of a software stack of the SDSaaS workspace to support flexibility and scalability across diverse customer environments.

* * * * *